United States Patent [19]

Frink

[11] 4,027,229

[45] May 31, 1977

[54] REGULATABLE PERMANENT MAGNET ALTERNATOR

[75] Inventor: Richard C. Frink, Norwich, N.Y.

[73] Assignee: Simmonds Precision, Engine Systems, Inc., Norwich, N.Y.

[22] Filed: Dec. 15, 1975

[21] Appl. No.: 640,768

[52] U.S. Cl. .................................. 322/50; 310/190
[51] Int. Cl.[2] ...................................... H02K 21/14
[58] Field of Search ................ 322/49, 50, 51, 52; 310/190, 191, 209, 193, 192, 86, 156, 104

[56] References Cited

UNITED STATES PATENTS

| | | | |
|---|---|---|---|
| 2,610,993 | 9/1952 | Stark | 322/50 X |
| 2,807,772 | 9/1957 | Melentine | 322/50 |
| 3,077,548 | 2/1963 | Moressee et al. | 310/191 X |
| 3,233,135 | 2/1966 | Holzer et al. | 322/50 X |
| 3,378,710 | 4/1968 | Martin, Jr. | 310/104 |
| 3,470,408 | 9/1969 | Lewis et al. | 310/190 X |

*Primary Examiner*—Donovan F. Duggan
*Attorney, Agent, or Firm*—Cooper, Dunham, Clark, Griffin & Moran

[57] ABSTRACT

This alternator includes a stator comprising an armature winding and a rotor comprising a permanent magnet field. A sleeve is located between the rotor and stator and comprises on its periphery alternating ferromagnetic and nonmagnetic segments. When the ferromagnetic segments are aligned with the poles of the stator, the flux linkage between the rotor and stator is maximum. When the nonmagnetic segments are aligned with the stator poles, the flux linkage is a minimum. The sleeve is shiftable through 90 electrical degrees by means of a motor. The output of the alternator may be regulated between maximum and minimum values by so shifting the sleeve.

10 Claims, 5 Drawing Figures

REGULATABLE PERMANENT MAGNET ALTERNATOR

BRIEF SUMMARY

The alternator of the invention comprises a rotor member and a stator member, each with projecting poles. One of the two members carries an armature winding and the other carries a permanent magnet field. A sleeve for regulating the flux linkage between the field and the armature winding is positioned between the stator and the rotor. The sleeve comprises a plurality of peripherally spaced stacks of laminations of ferromagnetic material. The number of stacks is equal to the number of poles on the armature. The field may have the same number of poles, or may have less. The sleeve also includes two end plates, one at each end of the sleeve. A plurality of rivets holds the sleeve together, one rivet extending through each stack and both end plates. Both ends of the stack have end plates of insulating material. One end of the stack also has a second end plate of metal, which is connected to a motor for positioning the sleeve and thereby regulating the alternator output. The rotor is supported on a shaft extending within the sleeve. The sleeve is journaled in a pair of bearing means located at opposite ends of the sleeve.

A method of assembling the sleeve is disclosed and includes the steps of assembling the stacks, rivets and end plates. Thereafter, that assembly is placed in a jig between an external cylinder and an internal cylinder and the spaces between the stacks are filled with molten plastic material (potting compound). This material is allowed to cool and harden. Each stack is provided on its opposite faces with grooves so that the hardened plastic space are keyed to the stacks of laminations.

DRAWINGS

DETAILED DESCRIPTION

Figure 1:
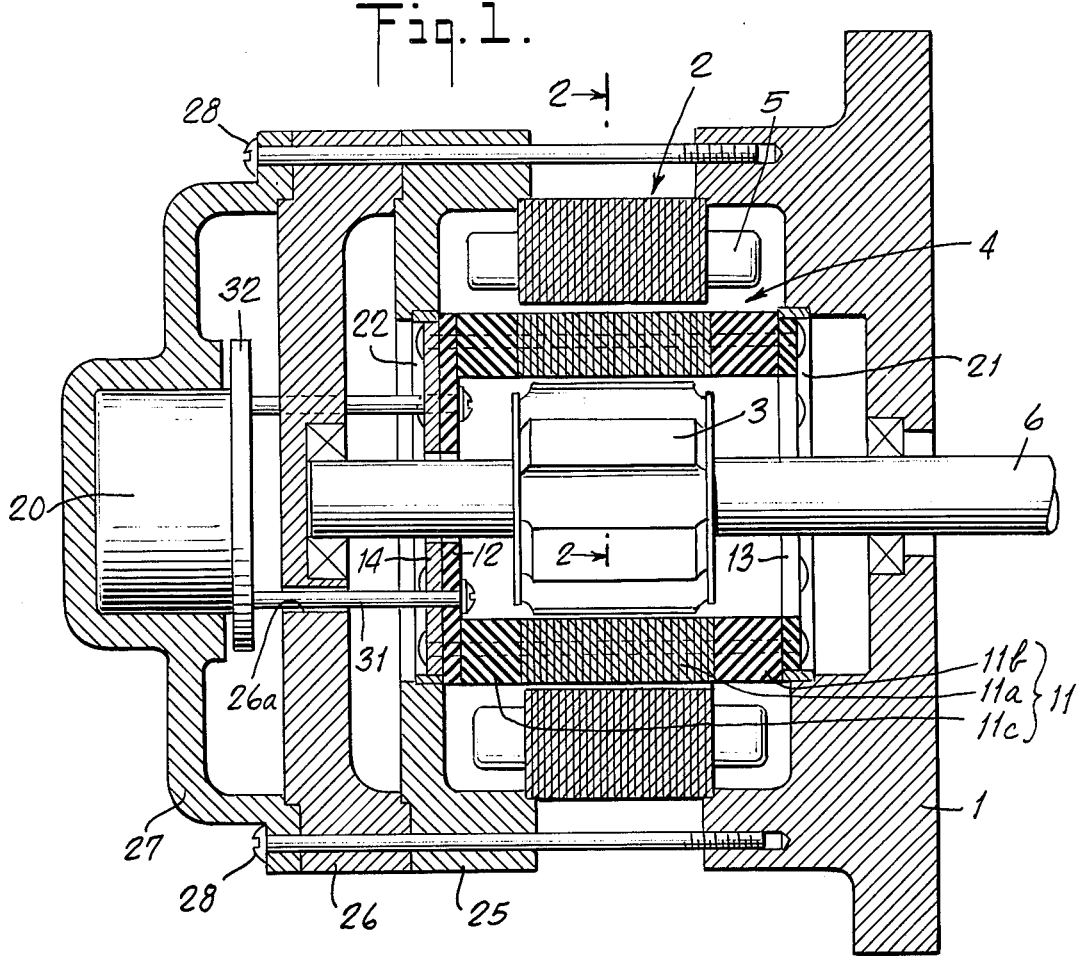
FIG. 1 is a cross-sectional view through a regulatable permanent magnet alternator according to the invention.

The alternator is mounted on a base plate 1 adapted for mounting on an engine (not shown), and includes a stator generally indicated at 2, a rotor 3 and a flux regulating sleeve 4.

The stator 2 serves as an armature in the embodiment illustrated, and is clamped between the base plate 1 and an opposite end plate 25. A shaft 6 extends from the engine through base plate 1 and the end plate 25 and is journaled in bearings in the base plate 1 and a journal plate 26. A cover plate 27 is mounted outside the plate 26. The plates 1, 25, 26 and 27 are fastened together by a plurality of through bolts 28.

The stator 2 comprises a stack of laminations including an annulus 2a with inwardly projecting poles 2b. An armature winding comprises a plurality of coils 5, one encircling each of the projecting poles 2b. Note that the poles 2b are straight-sided, i.e., they have no flared or projecting inner ends as is conventional in machines of this type. The flared or projecting ends may be used in an alternator constructed in accordance with the invention, but they are not necessary. Their omission greatly facilitates the assembly of the coils 5 on the poles 2b, since the coils can be preformed, slid over the projecting poles and bonded in place. Furthermore, the internal dimensions of the coils 5 may be made the same as the dimensions of poles 2b, thereby making more space for copper in the coils 5, than is available in alternators of conventional construction. The rotor 3 has at least one pair of radially outwardly projecting poles 3a, of alternating polarities. It is shown as having three pairs of poles. When the armature 2 has a polyphase winding, the number of poles on the field must be less than the number of poles on the armature. The number of bridging members 11 on the sleeve is still the same as the number of poles on the armature stator. The details of construction of the rotor 3 are not illustrated, and may be similar to those shown in the patent to Knudson et al, U.S. Pat. No. 3,508,095. The rotor 3 is fixed on the shaft 6.

The sleeve 4 comprises a plurality of axially extending ferromagnetic bridging members 11, each comprising a middle stack 11a of laminations of ferromagnetic material, and end extensions 11b, 11c.

Figure 4:
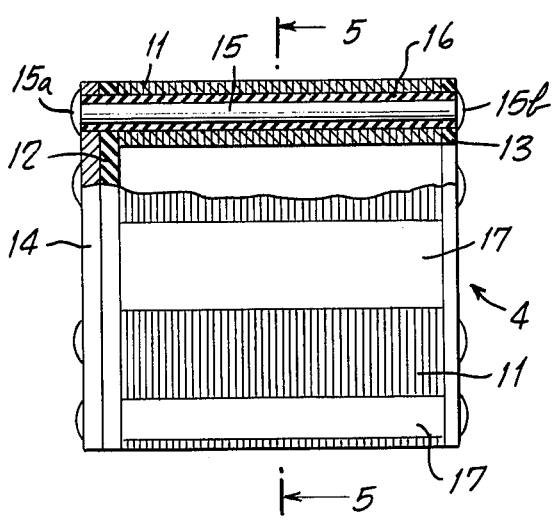
FIG. 4 is an elevational view of the flux regulating sleeve, partially broken away.
Figure 5:
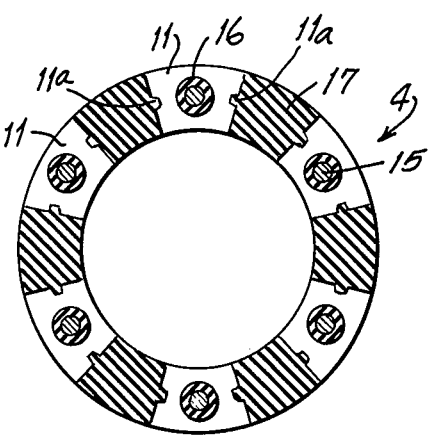
FIG. 5 is a view taken on the line 5—5 of FIG. 4.

The members 11 should be as long or longer than the stacks of laminations in the stator 2. The members 11 may extend beyond the laminations of the stator 2 in order that its bearings 21, 22, may be separated axially from the stator. The extensions 11b, 11c may either be laminated, as shown in FIG. 4, or they may be solid pieces of metal or insulating material, as shown in FIG. 1. They may alternatively be integral with the spacers 17 described below.

End plates 12 and 13 of insulating material extend across the two ends of the members 11. Another end plate 14, of metal, preferably steel, extends across one end only of the members 11. Each member is held between the end plates by a rivet 15 having an elongated shank and two heads 15a and 15b. The shank of each rivet 15 is encircled by a tube 16 of insulating material, which is effective to prevent short circuits or eddy currents between the laminations through the shank of rivet 15.

A pair of bearing rings 21 and 22, of friction reducing material, are received at the opposite inner faces of the plates 1 and 25 and support the sleeve 4. The sleeve 4 is driven through a limited angle about the shaft 6 by means of a pair of bolts 31 fixed in the end plates 14 and 15 and extending through slots 26a in the journal plate 26 to a drive plate 32 driven by a motor 20 received in the cover 27.

Figure 2:
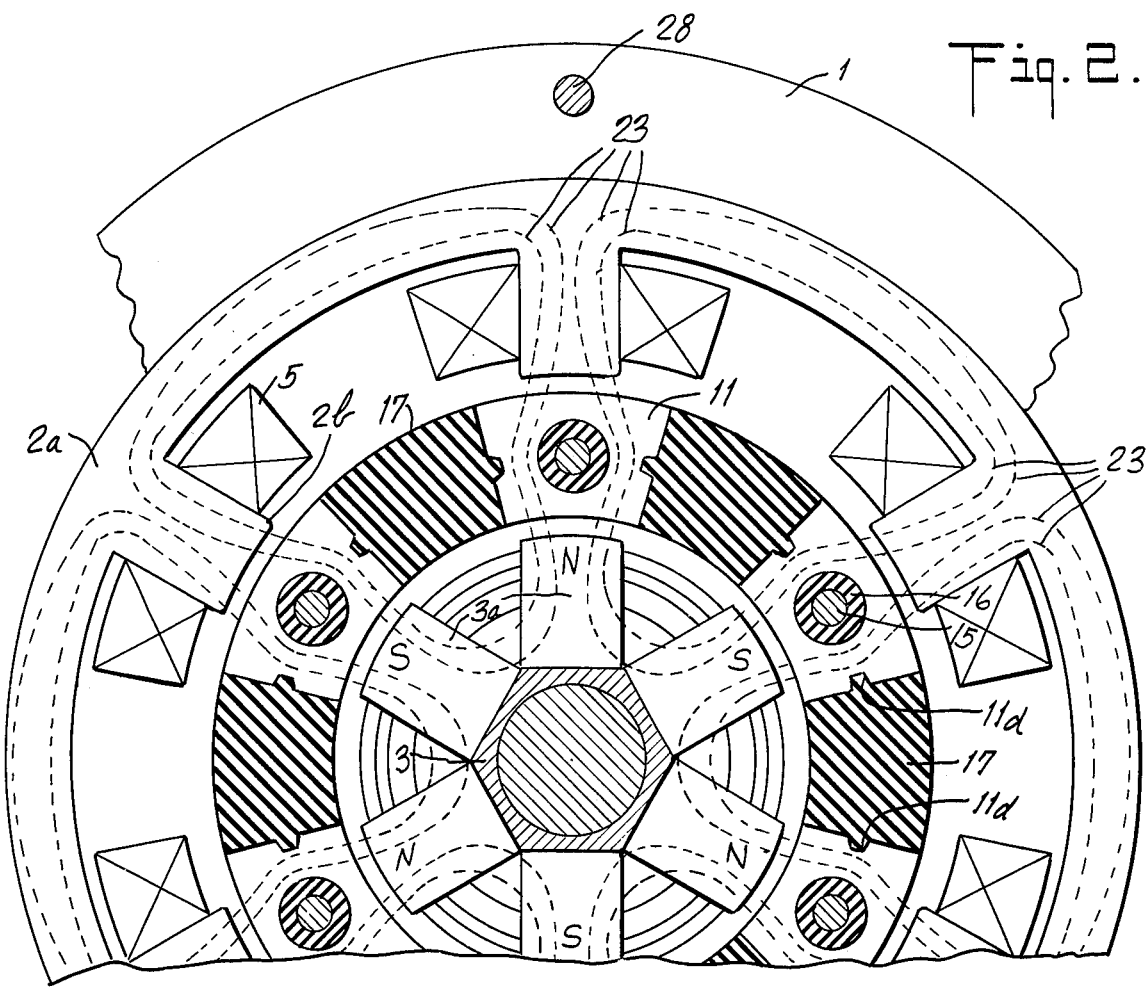
FIG. 2 is a fragmentary cross-sectional view on line 2—2 of FIG. 1 on an enlarged scale, showing the sleeve in its maximum flux linkage position.

When the sleeve 4 is in the angular position shown in FIG. 2, the members 11 are aligned with the stator poles 2b, and the flux path of lowest reluctance from one permanent magnet pole 3a to the next is through the aligned members 11, the poles 2b and the annulus 2a, as shown at 23 in FIG. 2. The flux through the path just described is at a maximum when the rotor 3 is in the angular position shown. As the rotor turns, the rate of change of flux through the armature coils 5 is at a maximum, and the alternator output is at its maximum.

Figure 3:
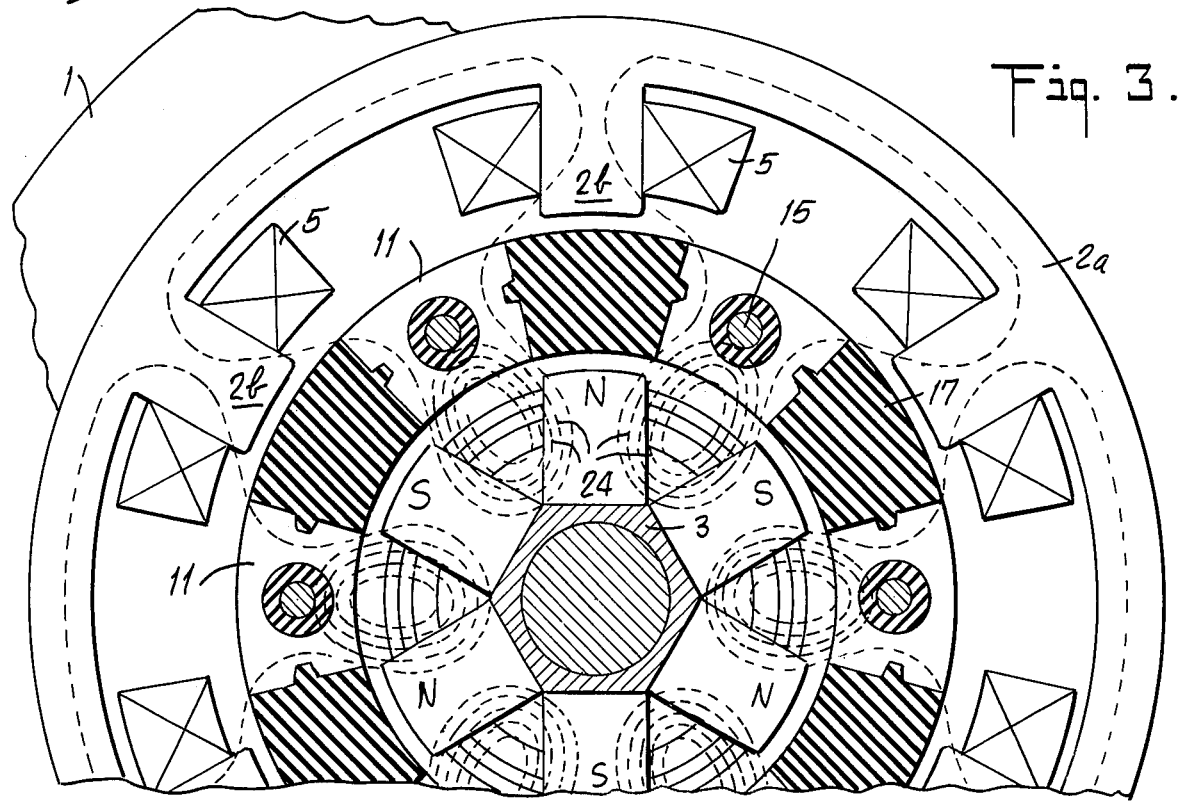
FIG. 3 is a view similar to FIG. 2, showing the sleeve in its minimum flux position.

When the sleeve is moved to the angular position of FIG. 3, where the members 11 are aligned with the spaces between the poles 2b, the path of lowest reluctance from one permanent magnet pole 3a to the next is directly through the adjacent member 11, which bridges the space between the ends of the rotor poles. This minimum reluctance path is shown at 24 in FIG. 3. Most of the rotor flux is thereby shunted away from the rotor poles 3a. As the rotor turns, the rate of change of flux through the armature coils 5 is at a minimum and the alternator output is at its minimum.

The members 11 are separated by an angle equal to the separation between two stator poles. Hence, the sleeve 4 need only rotate through 90 electrical degrees, i.e., an angle equal to one half of the pole separation angle in order to shift the alternator between its minimum output condition and its maximum output condition. The motor 20 may be either a two-position type or a proportioning type. A two-position type may be defined as one which holds the sleeve 4 either in the position of FIG. 2 or the position of FIG. 3. A proportioning type may be defined as one which would hold the sleeve in either of those positions or move it to any intermediate position, depending upon the requirements of the installation.

The flux regulating sleeve 4 may be assembled by first assembling the end plates 12 and 14 with the rivets 15, the tubes 16, and the members 11. The end plate 13 is then placed over the other end of the members, and the heads 15b of the rivets are peened over to hold the assembly together. This assembly is then placed in a jig with an external cylinder enclosing the sleeve and an internal cylinder blocking the space inside the sleeve. The spaces between members 11 are then filled with a molten plastic compound which is allowed to cool and harden, thereby forming rigid insulating spacers 17 between the members 11. Each member 11 is provided with a pair of recesses 11d on its opposite radially extending faces, so that when the insulating compound has hardened, each spacer 17 is keyed to both the adjacent stacks 11 by the compound which has flowed into the recesses 11a.

Note that the members 11 have a longer circumferential extent than the ends of the poles 2b. Hence they serve to direct the flux through the poles 2b, even when they are somewhat misaligned from those poles.

I claim:

1. A regulatable permanent magnet alternator, including:
   a. a stator member having at least one pair of poles;
   b. a rotor member having at least one pair of poles;
   c. permanent magnet field means on one of said members;
   d. armature winding means on the other of said members;
   e. a hollow cylindrical sleeve coaxial with the rotor member and extending between the stator member and rotor member, said sleeve comprising:
      1. a plurality of peripherally spaced bridging members, each bridging member including a stack of laminations of ferromagnetic material, said bridging members being equal in number to the number of stator poles;
      2. two end plate means, one at each end of said sleeve;
      3. a plurality of fastening means, each including a rod extending through one of the bridging members and both end plate means; and
   f. means operatively connected to the sleeve for shifting the angular position thereof to change the alignment of the bridging members with respect to the stator poles, and thereby the magnetic flux linkage between the field means and the armature winding means.

2. An alternator as in claim 1, including an insulating tube extending between each bridging member and its associated rod.

3. An alternator as in claim 1, in which said sleeve is axially longer than the stator and rotor poles.

4. An alternator as in claim 1, in which:
   a. each of said end plate means comprises a plate of insulating material;
   b. one of said end plate means further comprises a metal end plate; and
   c. said motor means is drivingly connected to said metal end plate.

5. An alternator as in claim 1, including spacers of insulating material between said stacks of laminations and keyed to said stacks.

6. An alternator as in claim 1, including:
   a. a housing supporting said stator member;
   b. a pair of support means spaced from opposite ends of the stator member and supporting said sleeve; and
   c. means in one end of said housing supporting said shifting means.

7. An alternator as in claim 6, in which each support means includes a bearing receiving one of said end plate means.

8. An alternator as in claim 1, in which the poles of said other member have flat radially and axially extending sides.

9. An alternator as in claim 1, including a plurality of spacers of insulating material, equal in number to said bridging members, each located between two of said bridging members.

10. An alternator as in claim 9, in which each spacer is keyed to the two adjacent bridging members.

* * * * *